United States Patent
Gu et al.

(10) Patent No.: US 8,102,165 B2
(45) Date of Patent: Jan. 24, 2012

(54) MEANS OF ELIMINATING ELECTROLYTIC CAPACITOR AS THE ENERGY STORAGE COMPONENT IN THE SINGLE PHASE AD/DC TWO-STAGE CONVERTER

(75) Inventors: Linlin Gu, Nanjing (CN); Ming Xu, Blacksburg, VA (US); Xinbo Ruan, Nanjing (CN); Kai Yao, Nanjing (CN)

(73) Assignees: FSP Technology Inc., Taoyuan Hsien (TW); Nanjing University of Aeronautics and Astronautics, Nanjing (CN)

( * ) Notice: Subject to any disclaimer, the term of this patent is extended or adjusted under 35 U.S.C. 154(b) by 420 days.

(21) Appl. No.: 12/496,025

(22) Filed: Jul. 1, 2009

(65) Prior Publication Data
US 2010/0014326 A1   Jan. 21, 2010

(30) Foreign Application Priority Data

Jul. 17, 2008 (TW) .............................. 97127057 A
Jul. 18, 2008 (TW) .............................. 97127239 A

(51) Int. Cl.
*G05F 1/40* (2006.01)
*G05F 1/10* (2006.01)
*G05F 5/00* (2006.01)

(52) U.S. Cl. .................... 323/285; 323/222; 323/299
(58) Field of Classification Search ................. 323/222, 323/266, 268, 271, 282, 285, 299
See application file for complete search history.

(56) References Cited

U.S. PATENT DOCUMENTS

| | | | | |
|---|---|---|---|---|
| 4,779,185 | A * | 10/1988 | Musil | 363/73 |
| 6,469,485 | B2 * | 10/2002 | Cheng et al. | 323/286 |
| 7,719,139 | B2 * | 5/2010 | Uno et al. | 307/80 |

* cited by examiner

*Primary Examiner* — Matthew Nguyen
(74) *Attorney, Agent, or Firm* — Muncy, Geissler, Olds & Lowe, PLLC

(57) ABSTRACT

A power factor correction (PFC) circuit includes an inductor, a diode, a storage capacitor, a switch and a control unit. The input power has a voltage fluctuation $V_1$. The storage component absorbs a first voltage fluctuation and a switch regulation circuit absorbs a second voltage fluctuation $V_2$. Thus output voltage from the PFC circuit is not a conventional constant voltage but a voltage of a great ripple. The PFC circuit further has a harmonic regulation unit. The harmonic regulation unit generates a voltage signal containing $3^{rd}$ harmonic. The control unit receives a feedback signal and the voltage signal containing $3^{rd}$ harmonic to generate a reference to the inductor current. Therefore, the inductor current contains $3^{rd}$ harmonic. Thus power fluctuation absorbed and released by the capacitor is smaller. As a result energy storage capacitance can be reduced significantly.

7 Claims, 8 Drawing Sheets

MEANS OF ELIMINATING ELECTROLYTIC CAPACITOR AS THE ENERGY STORAGE COMPONENT IN THE SINGLE PHASE AD/DC TWO-STAGE CONVERTER

FIELDS OF THE INVENTION

The present invention relates to a power factor correction circuit and particularly to a control circuit for using in active power factor correction circuit.

BACKGROUNDS OF THE INVENTION

Power supply is widely used in various types of electronic devices nowadays. As technology advances constantly, the output power of power supply also increases continuously. To further boost the output power, its power efficiency has to be enhanced. There are many factors impacting efficiency, such as the input power factor and loss of power conversion. Power factor correction (PFC in short hereinafter) converter is used to improve the input power factor in the power supply. An active PFC circuit can improve the power factor to 95% or more. Referring to FIG. 1, the input power goes through a rectification circuit 8 and is regulated by the PFC circuit 1 to correct the input power factor. Then the output voltage of the PFC circuit 1 is further regulated by a Power conversion unit 9 to become a constant output voltage. The Power conversion unit 9 may be a converter or a switch type conversion circuit. The PFC circuit 1 and the Power conversion unit 9 are respectively controlled by a first control unit 11 and a second control unit 91. A typical PFC circuit 1 includes a switch 12, an inductor 13, a storage capacitor 14, a diode 15 and the first control unit 11. The first control unit 11 receives a feedback signal from the output voltage of the PFC circuit 1 and incorporates with a zero current detection (ZCD) circuit and a RS flip-flop to generate a period control signal to drive the switch 12, thereby regulate the input power factor. The operation principle of the PFC circuit 1 is known in the art, thus details are omitted herein. To balance the pulsating input power and the constant output power, the storage capacitor 14 must have a greater capacitance and usually use electrolytic capacitor. The rated lifetime of conventional electrolytic capacitor is only a few thousand hours. So the conventional PFC circuit 1 has a limited lifetime due to the usage of electrolytic capacitor. Please refer to FIGS. 2 and 3, where $v_g$ is the voltage after rectification, $v_{CB}$ is the storage capacitor voltage in the PFC circuit, and $v_o$ is the output voltage of the power supply. The multiplication product of $v_{in}$ and $i_{in}$. $p_{in}$ is the instantaneous input power (referring to FIG. 3). As shown in FIGS. 2 and 3, the input power $p_{in}$ is pulsating and the output power of PFC circuit is constant owing to its constant power load which is usually a DC/DC converter. The storage capacitor voltage $v_{CB}$ in the conventional PFC circuit is constant with small voltage ripple, saying about 10~20V peak to peak. Therefore, electrolytic capacitor which has large capacitance is required. Therefore, incorporating the PFC circuit 1 in a long life electronic element results in a waste. For instance, adopting the conventional PFC circuit 1 in a driving circuit to drive LEDs whose lifetime is about 100,000 hours, the PFC circuit 1 could last only up to about 20 thousand hours. Then the circuit board with the PFC circuit 1 mounted thereon and LEDs soldered thereon have to be replaced. The LEDs which are being used for less than one half of their lifetime also have to be discarded with the entire circuit board. This is a waste and makes the cost higher. Therefore, the lifetime of the PFC circuit 1 must be prolonged to deserve long life LEDs.

SUMMARY OF THE INVENTION

In view of the problem of the conventional power factor correction (PFC) converter that is limited by the lifetime of electrolytic capacitor, it is an object of the present invention to provide a circuit structure to overcome the aforesaid shortcoming of the conventional techniques and prolong the lifetime of PFC circuit.

The present invention provides a PFC circuit which includes an inductor, a storage capacitor, a switch, a diode and a control unit. The control unit generates a period control signal to control the switch, thereby to control the inductor current. The present PFC circuit has a harmonic regulation unit and a multiplier 3. The harmonic regulation unit is used to obtain harmonic wave from the voltage after rectification and the amplitude of the harmonic wave can be regulated by it. The multiplier 3 receives a feedback signal of output voltage and the voltage signal containing $3^{rd}$ harmonic, and its output is the reference to the inductor current. Therefore, the input current of the PFC circuit is regulated to the desired wave. Such an approach can reduce the fluctuation of the input power. And the storage capacitor with less capacitance can be selected (such as a film capacitor to replace the electrolytic capacitor in the conventional circuit) to prolong the lifetime of the PFC circuit and improve the power density.

In addition, the power supply includes a PFC circuit and a power conversion unit. The PFC circuit has a storage capacitor. The power conversion unit has a switching regulation circuit. The input power of PFC circuit is pulsating, while the power conversion unit is constant power load for PFC circuit. By means of the technique set forth above, output voltage of the PFC circuit is not the constant voltage output from the conventional circuit, but a voltage which has a larger ripple, saying hundreds of voltage peak-to-peak, which is against the conventional wisdom. Then the voltage can be regulated to a constant output voltage by the power conversion unit located after the PFC circuit. Hence the energy storage capacitance can be greatly reduced to increase the lifetime of the PFC circuit. Compared with the conventional PFC circuit which has a larger storage capacitance to stabilize the output of the PFC circuit at constant voltage with very small amount of voltage ripple, the invention uses a storage capacitor with less capacitance; as a result, the output voltage of the PFC circuit is not a constant voltage as that of the conventional PFC circuit, but a output voltage with a larger ripple. Therefore, the energy storage capacitance can be reduced significantly, and the lifetime of the PFC circuit can be extended.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
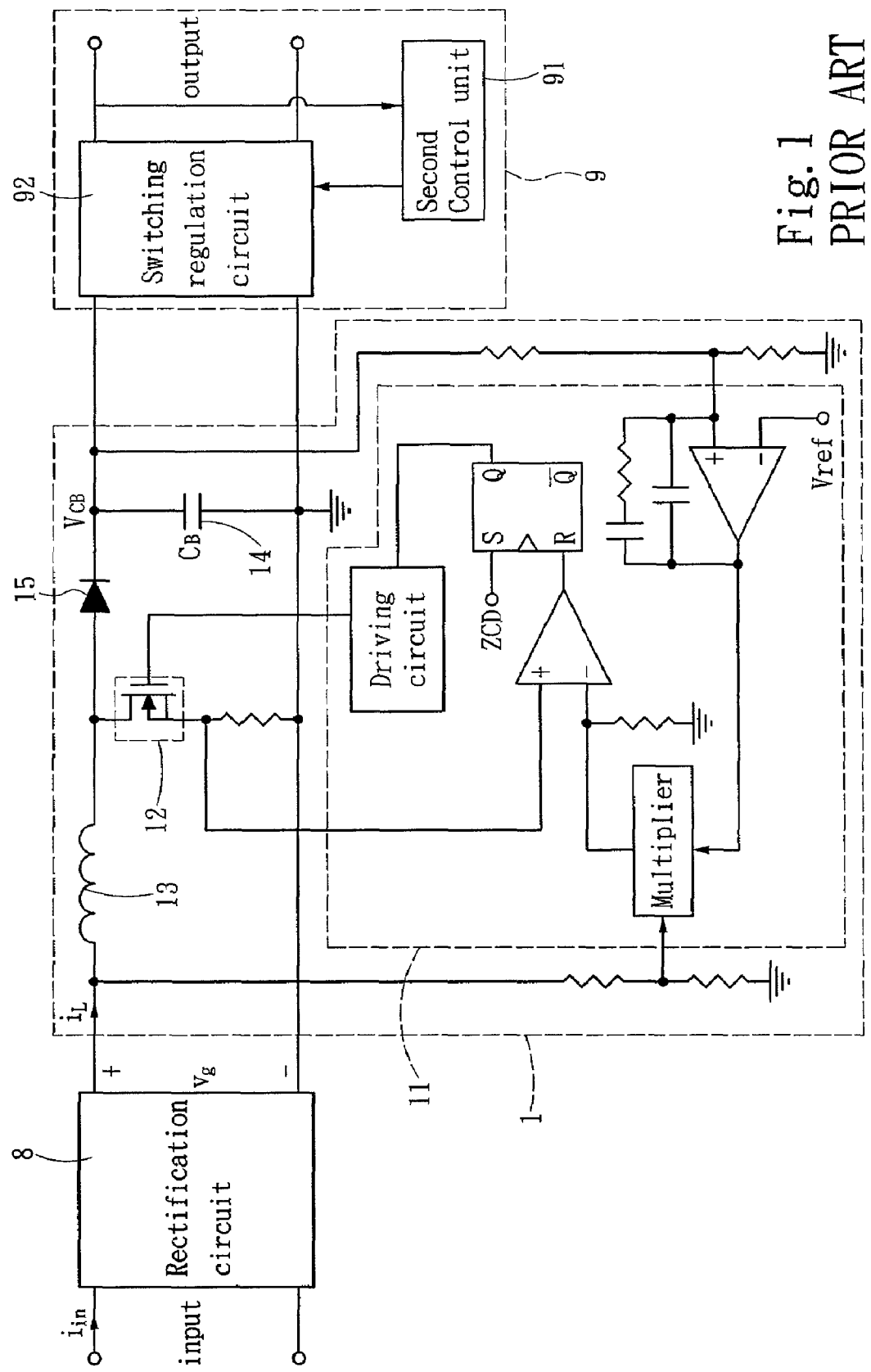
FIG. 1 is the diagram of conventional power factor correction circuit.
Figure 2:
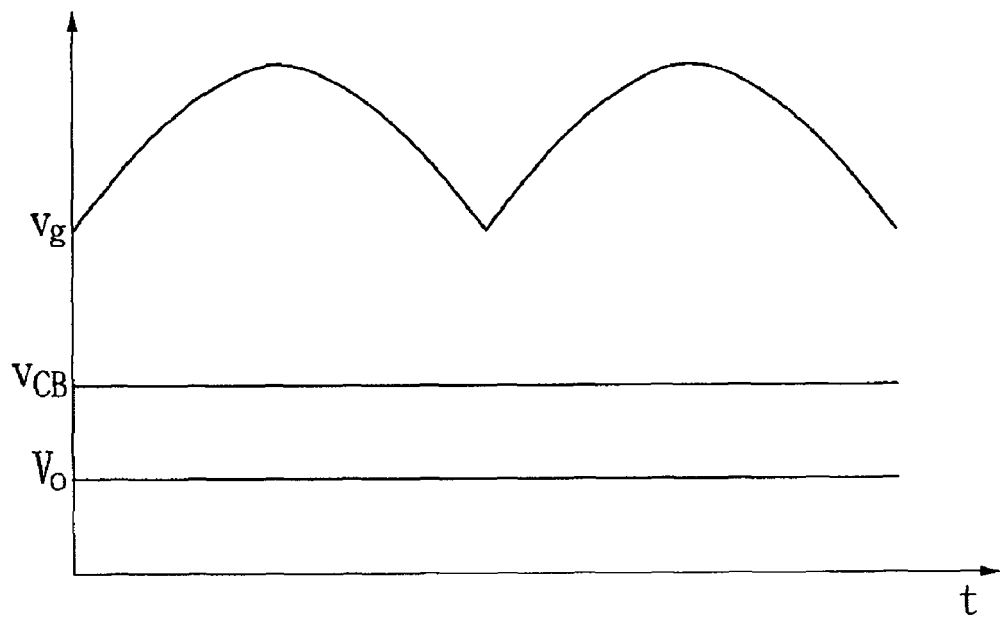
FIG. 2 is the voltage waveform of conventional power factor correction circuit.
Figure 3:
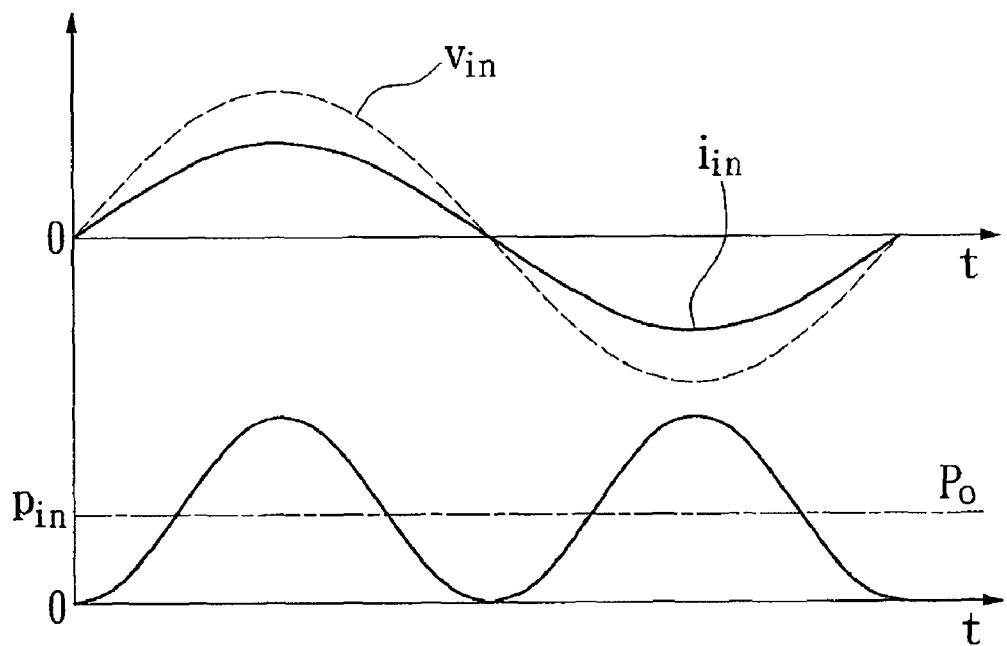
FIG. 3 is the power waveform of conventional power factor correction circuit.
Figure 4:
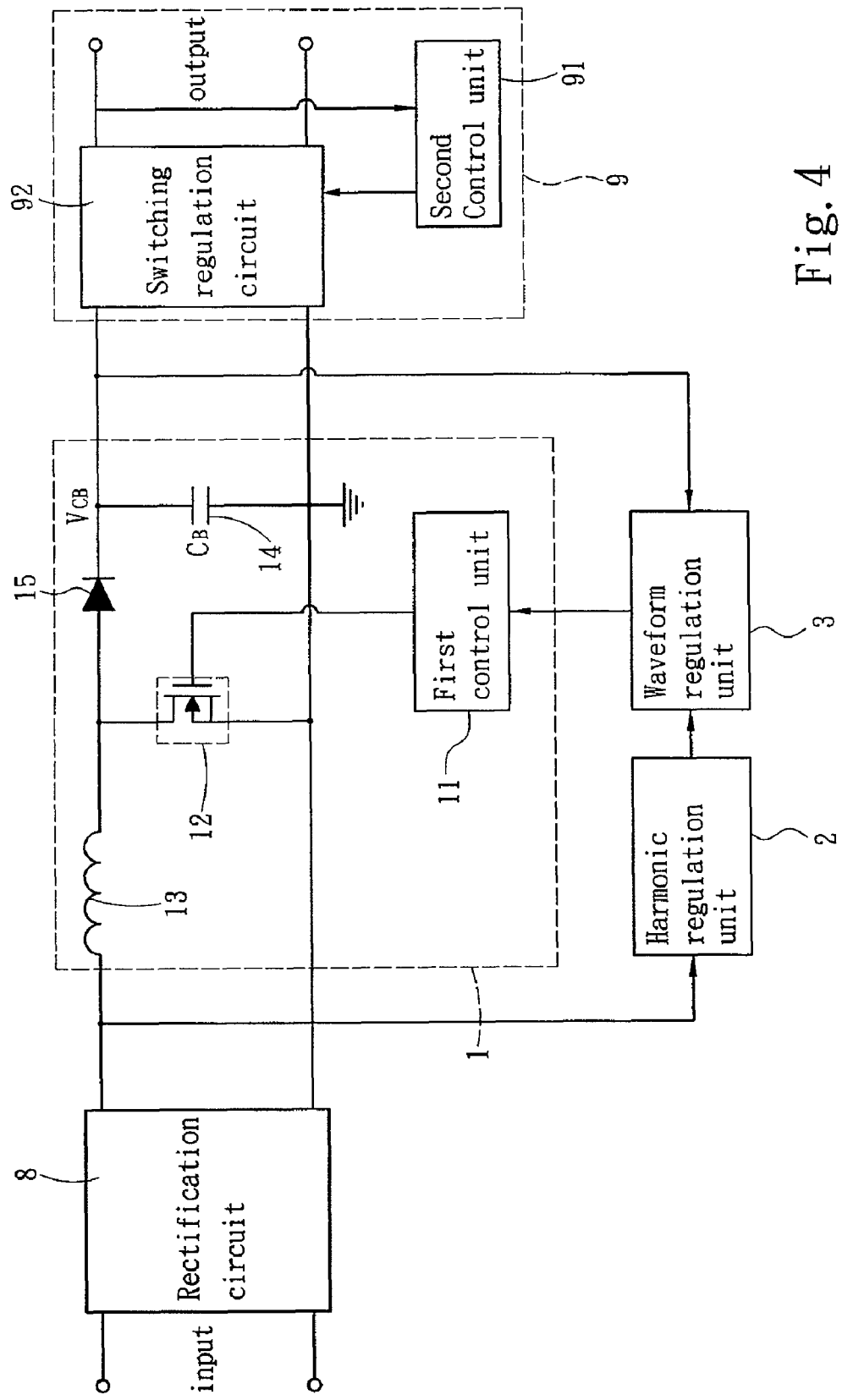
FIG. 4 is the circuit block diagram of the invention.
Figure 5:
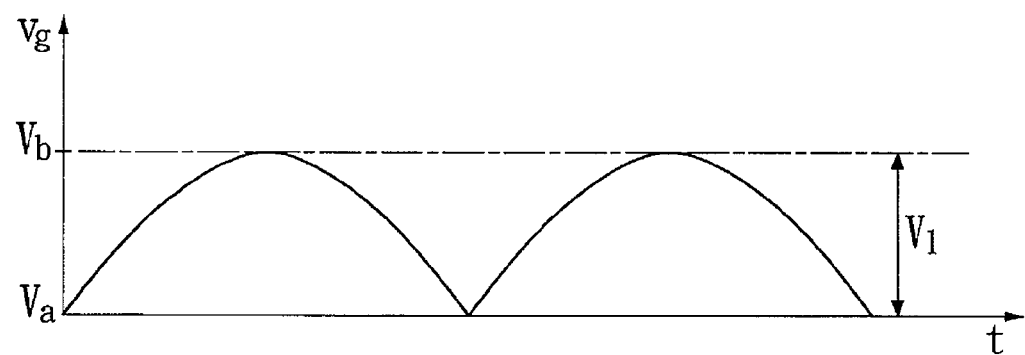
FIG. 5 is the waveform of rectified input voltage.
Figure 6:
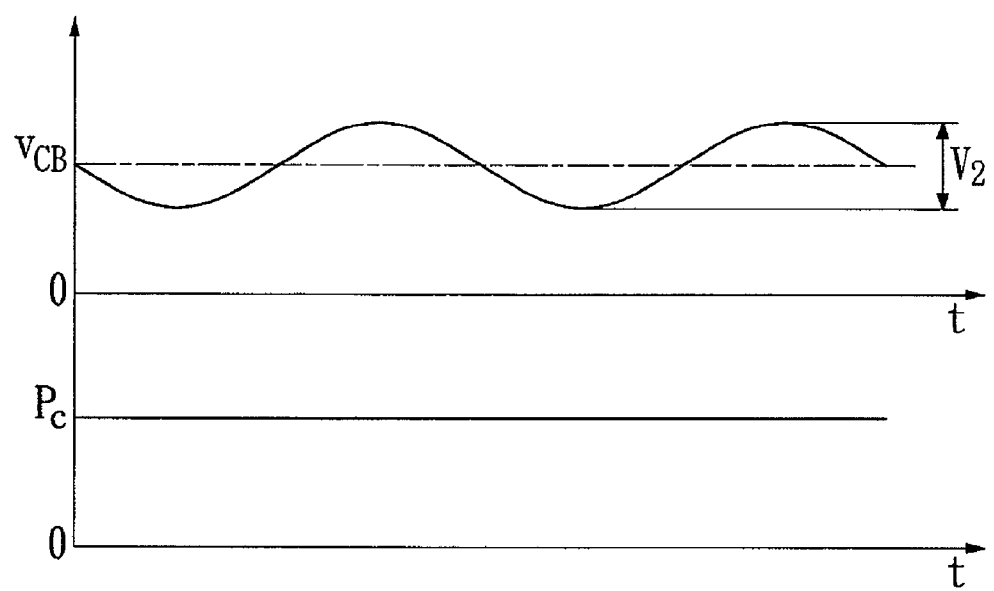
FIG. 6 is the voltage waveform regulated by the power factor correction circuit of the invention.
Figure 7:
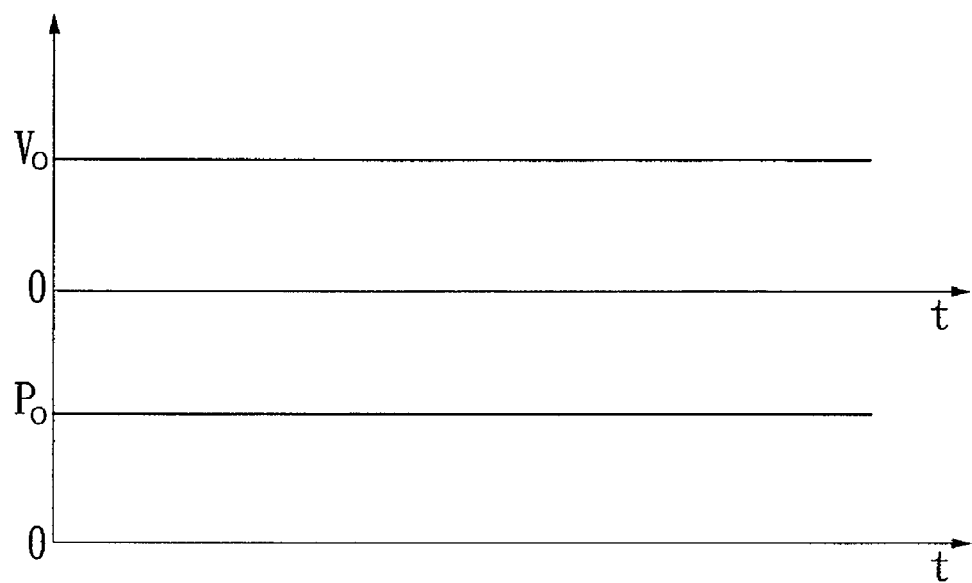
FIG. 7 is the output waveform regulated by the power factor correction circuit of the invention.
Figure 8:
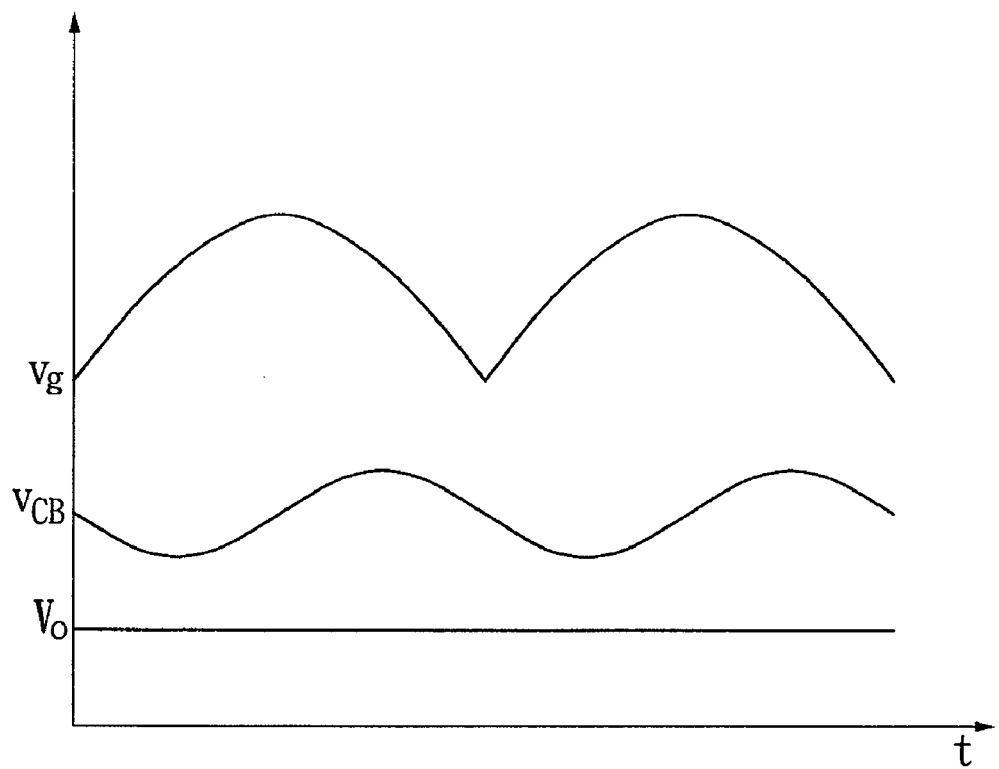
FIG. 8 is voltage waveform regulated by the power factor correction circuit of the invention.

Please refer to FIG. 4 for a circuit block diagram of an embodiment of the invention. The power supply according to the invention includes a rectification unit 8, a power factor correction (PFC) circuit 1 and a power conversion unit 9. The power conversion unit 9 may be a flyback circuit. The PFC circuit 1 includes an inductor 13, a storage capacitor 14, a switch 12, a diode 15 and a first control unit 11. The first control unit 11 generates a period control signal to drive switching of the switch 12, thereby controls an inductor current passing through the inductor 13 so that the input power factor is regulated. The PFC circuit 1 is driven by the first control unit 11, and the power conversion unit 9 is driven by a second control unit 91. The PFC circuit 1 is set on by a switch 12 switched by the first control unit 11 to regulate input power factor. This is a technique known in the art, thus details are omitted herein. In FIG. 4 when the input power factor is unity, the input voltage (rectified input voltage $v_g$) and current are sine waveform. Multiplying these two generates a greater power fluctuation (referring to FIG. 10 for the power waveform of a conventional one). Also refer to FIGS. 5, 6 and 7, with FIG. 5 showing the waveform of the input power voltage $v_g$. A voltage fluctuation $V_1$ is defined between a peak value $V_b$ and a valley value $V_a$ of the input power voltage $v_g$. The PFC circuit 1 has a storage capacitor 14. The power conversion unit 9 has a switching regulation circuit 92. The input power passes through the storage capacitor 14 which absorbs a first voltage fluctuation. As a result, the input power passing through the PFC circuit 1 is regulated to become power having the second voltage fluctuation $V_2$ (shown as $v_{CB}$ in FIG. 6). Power curve $p_c$ shown in FIG. 6 is output power of the PFC circuit 1. Although the PFC circuit 1 absorbs only a portion of voltage fluctuation, due to the power conversion unit 9 at the rear stage is a constant power load, the output power of the PFC circuit 1 is constant. But the voltage $v_{CB}$ still has the second voltage fluctuation $V_2$ which is not being absorbed. Referring to FIG. 7, the output voltage $v_{CB}$ from the PFC circuit 1 is regulated by the switching regulation circuit 92 to become a constant output voltage $V_O$. After the PFC circuit 1 is regulated, the input power $v_{CB}$ is sent to the switching regulation circuit 92 which performs high frequency regulation to make the voltage $v_{CB}$ containing the second voltage fluctuation $V_2$ to become the constant output voltage $V_o$. Compared with the conventional technique which has a capacitor with large capacitance in the PFC circuit 1, and the output voltage of the conventional PFC circuit 1 is eventually constant, the storage capacitor 14 provided by the invention can be a capacitor with less capacitance to absorb the first voltage fluctuation, while the input power still has fluctuation of the second voltage fluctuation $V_2$ as shown in FIG. 8. Compared the waveforms in FIGS. 8 and 2, the voltage after being regulated by the PFC circuit 1 of the invention is no longer the constant voltage output from the conventional PFC circuit, but has a greater ripple that passes through the switching regulation circuit 92 to become the constant output voltage $V_o$.

By means of the technique of the invention previously discussed, the PFC circuit 1 of the invention has a capacitor with less capacitance (such as a film capacitor) to serve as the storage capacitor 14. Thus the cost of the storage capacitor 14 can be reduced and power fluctuation absorbed and released by the storage capacitor 14 also is smaller. As a result, the lifetime of the PFC circuit 1 is extended. The power supply thus formed also can be made at a lower cost and smaller size.

Please refer to FIG. 4. In order to increase the lifetime of the storage capacitor 14, the PFC circuit 1 further has a harmonic regulation unit 2 and a waveform regulation unit 3. The harmonic regulation unit 2 receives the rectified input voltage and generates a voltage signal containing $3^{rd}$ harmonic by processing. The waveform regulation unit 3 receives a feedback signal from the output of the PFC circuit 1 and regulates the feedback signal according to the voltage signal containing $3^{rd}$ harmonic to generate a current reference signal. Namely the feedback signal is regulated to adjust the amplitude of the voltage signal containing $3^{rd}$ harmonic to form the current reference signal. The current reference signal is sent to the first control unit 11 to regulate the period width of the period control signal according to the current reference signal. The period control signal sets ON/OFF of the switch 12 to regulate the inductor current. Hence by regulating the period control signal through the current reference signal, the inductor current has the same phase as the voltage signal containing $3^{rd}$ harmonic (namely the inductor current also contains harmonic wave). By means of the circuit structure set forth above, the period control signal contains the harmonic wave so that the inductor current is regulated to have the same phase as the voltage signal containing $3^{rd}$ harmonic. When the harmonic wave is added to the inductor current, the inductor current fluctuation changes, the multiplication product of the inductor current and input voltage also changes. Hence the input power fluctuation is smaller. Consequently, the input power fluctuation absorbed by the storage capacitor 14 also decreases. Hence accelerated attenuation of the storage capacitor 14 can be prevented. The life span of the storage capacitor 14 increases and the storage capacitor 14 with less capacitance can be selected.

Figure 9:
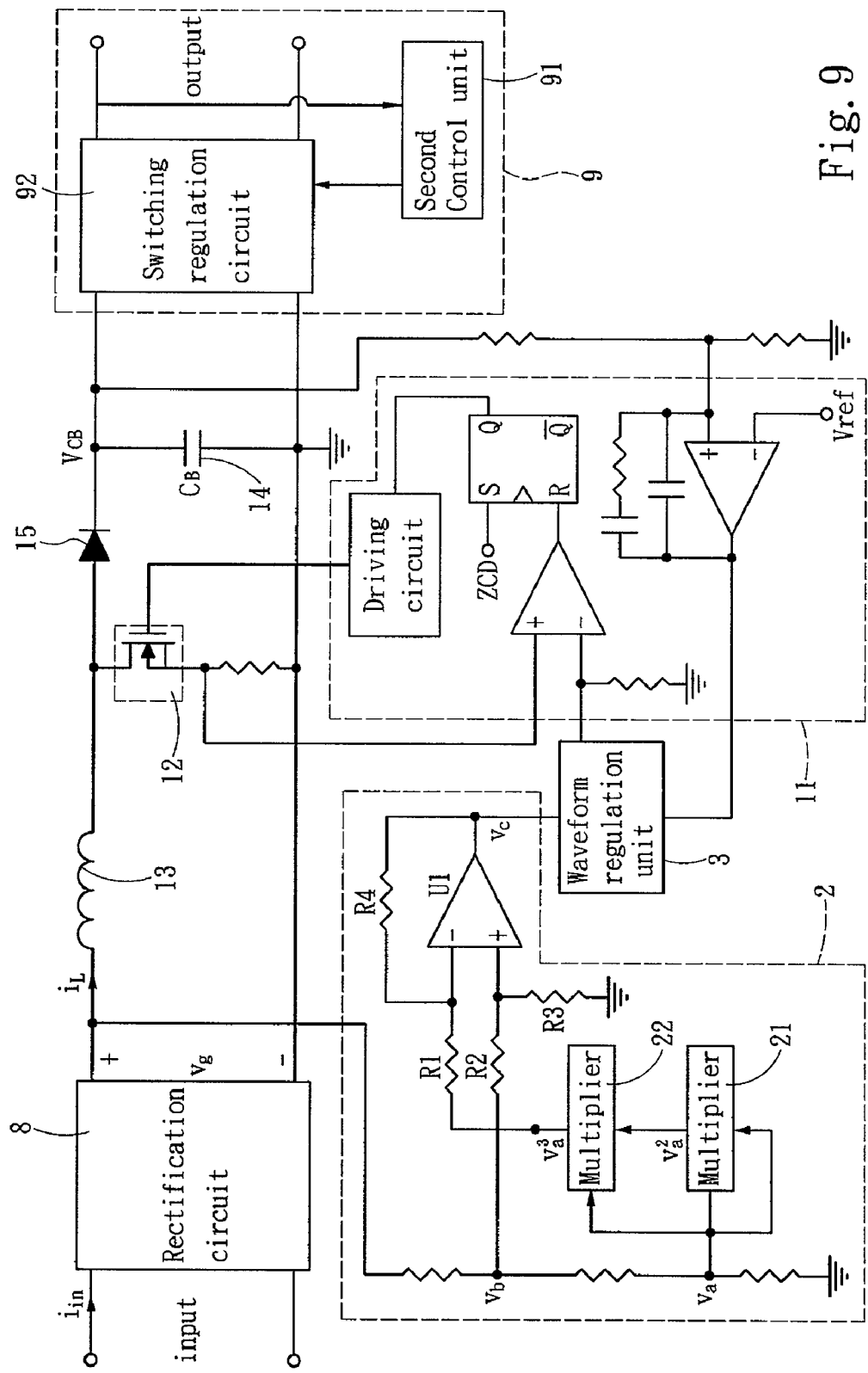
FIG. 9 is the circuit diagram of an embodiment of the invention.

In order to add the harmonic wave in the period regulation circuit, the harmonic regulation circuit 2 contains two multipliers and one subtracter. The multiplier gets a rectified input voltage signal from the rectified input voltage. The rectified input voltage signal is multiplied to get a harmonic wave. Refer to FIG. 9 for an embodiment of the aforesaid circuit. The harmonic regulation unit 2 has two multipliers 21 and 22 to receive a same rectified input voltage signal $v_a$. One multiplier 21 multiplies the rectified input voltage signal $v_a$ twice to get $v^2_a$. Another multiplier 22 multiplies the harmonic wave $v^2_a$ and the rectified input voltage signal $v_a$ to get $v^3_a$. $v^3_a$ is sent to the subtracter which consists of a process amplifier U1 and resistors R1, R2, R3 and R4. The output of the subtracter $v_c$ contains $3^{rd}$ harmonic. The harmonic regulation unit 2 may also be a multiplier to multiply the feedback signal and the voltage signal containing $3^{rd}$ harmonic $v_c$ to generate the current reference signal. Hence the current reference signal also contains the $3^{rd}$ harmonic. In the circuit shown in FIG. 9, the first control unit 11 gets the current reference signal and the current of the switch 12. The two signals are compared to determine OFF time series of the switch 12. In the event that the inductor current detected is greater than the current reference signal, the comparator sends a higher level output to reset the RS flip-flop so that the driving unit sets off the switch 12. Thus the inductor current is confined within the waveform formed by the current reference signal, and the inductor current has a waveform containing the $3^{rd}$ harmonic.

Figure 10:
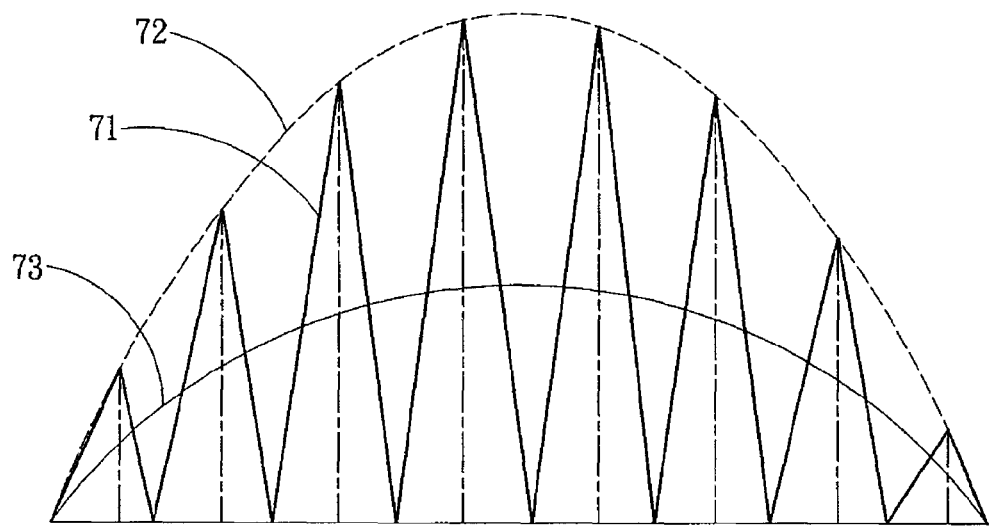
FIG. 10 is the current waveform of conventional power factor correction circuit.
Figure 11:
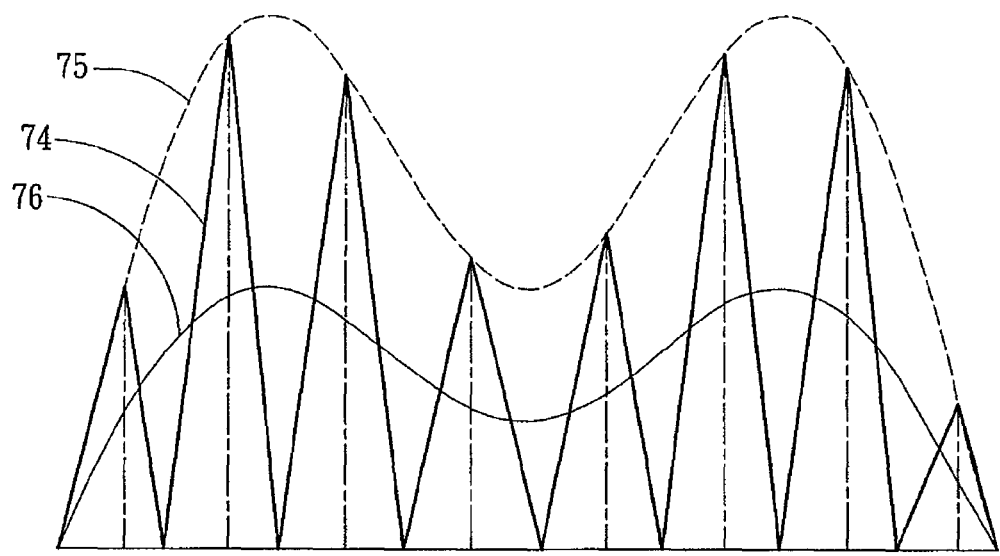
FIG. 11 is the current waveform of the invention.
Figure 12:
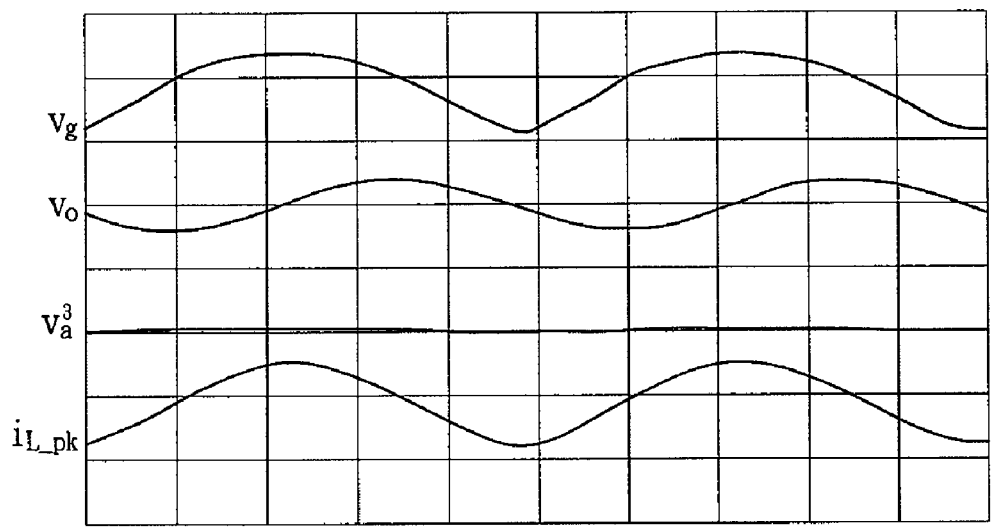
FIG. 12 is the main waveforms of conventional power factor correction circuit.
Figure 13:
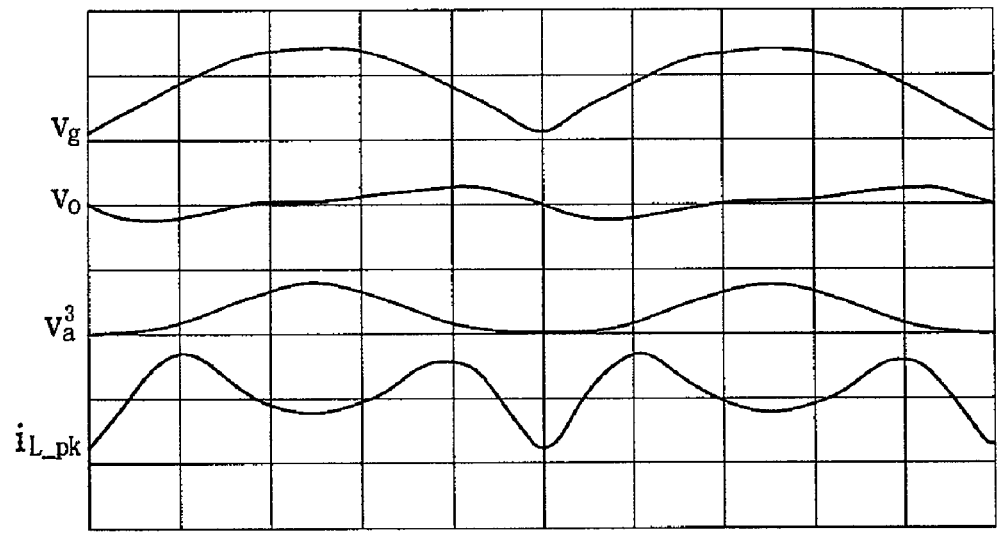
FIG. 13 is the main waveforms of the invention.

Refer to FIG. 10 for the current waveform of a conventional PFC circuit and FIG. 11 for the current waveform of circuit of the invention previously discussed. FIG. 10 shows the waveforms of a conventional inductor current 71, a conventional current peak envelope curve 72 and a conventional current average value 73. The conventional inductor current 71 is controlled by ON/OFF of the switch 12. The conventional circuit generates the conventional current peak envelope curve 72. Namely by forcing the maximum current of the switch 12 at the OFF time, the inductor current 71 is limited smaller than the conventional current peak envelope curve 72. Through processing the conventional current average value 73 is obtained. As shown in FIG. 11, by adding the harmonic wave in a current peak envelope curve 75, the peak value of inductor current 74 and a current average value 76 also contain harmonic waveforms. Refer to FIG. 12 for waveforms at various nodes of the conventional circuit and FIG. 13 for waveforms at various nodes of the invention, where $v_g$ is being defined as the voltage waveform of the input power after rectification, $v_o$ is being defined as the output voltage of the PFC circuit 1, $v_a^3$ is being defined as the harmonic wave generated by the harmonic regulation unit 2, and $i_L$ is being defined as the inductor current. FIG. 12 shows the conventional circuit capable of generating the harmonic wave; hence $v_a^3$ is a straight line to indicate its absence. The rectified input voltage $v_g$ is a sinusoidal wave. The conventional inductor current $i_L$ also is a sinusoidal wave. When the phases of the input voltage waveform $v_g$ and the conventional inductor current $i_L$ are regulated to be coincided with each other, the peak power generated by multiplying the two is greater. It forms a greater difference with the minimum power. Hence the power absorbed and released by the storage capacitor 14 also is greater. Referring to FIG. 13, after adding the harmonic wave $v_a^3$, the phases of the peak value of the inductor current $i_L$ and the peak value of the input voltage waveform $v_g$ are shifted away from each other. As a result, the peak power generated by multiplying the two is reduced significantly. The power absorbed and released by the storage capacitor 14 also is smaller. Thus accelerated attenuation of the storage capacitor 14 that might otherwise take place due to charging and discharging for a prolonged period of time can be prevented, and the life span increases.

The harmonic regulation unit 2 mentioned above is a based embodiment of the present invention, the harmonic regulation unit 2 can further install a plurality of multipliers to continuously generate $5^{th}$ harmonic or $7^{th}$ harmonic or the combination of the harmonic thereof, so as the voltage signal containing harmonic is formed. By means of the circuit set forth above, the peak value of input power is lower, and the power fluctuation of the storage capacitor 14 caused by power absorption and release can be reduced. The storage capacitor 14 with less capacitance can be selected and the lifetime is longer. The PFC circuit 1 is less likely to be damaged due to the attenuation of the storage capacitor 14. And a film capacitor can be selected to replace the electrolytic capacitor used on the conventional circuit, and the PFC circuit 1 mentioned above can work in continuous current mode (CCM) or in discontinuous current mode (DCM). It is not limited to generate the harmonic wave by the multiplier, but still can use other circuits to realize the technique of generating the harmonic wave, and the purpose of generating the harmonic wave is to reduce the fluctuation of the input power.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A power factor correction circuit comprising an inductor, a storage capacitor, a switch, a diode and a control unit, the control unit generating a period control signal to drive switching of the switch to control the inductor current of the power factor correction circuit, further including:
    a harmonic regulation unit to receive the voltage after rectification and generate a voltage signal containing $3^{rd}$ harmonic by processing; and a waveform regulation unit to receive a feedback signal and the voltage signal containing $3^{rd}$ harmonic and regulate the feedback signal to a current reference signal according to the voltage signal containing $3^{rd}$ harmonic, the control unit regulating the duty cycle and the period according to the current reference signal.

2. The power factor correction circuit of claim 1, wherein the harmonic regulation unit includes at least two multipliers and one subtracter, the multiplier receiving a rectified input voltage signal from the input power and multiplying the rectified input voltage signal to get a harmonic wave, the subtracter subtracting the harmonic wave from the input power to generate the voltage signal containing $3^{rd}$ harmonic.

3. The power factor correction circuit of claim 2, wherein the harmonic regulation unit includes at least two multipliers to receive the same rectified input voltage signal from the input power, one multiplier multiplying the rectified input voltage signal twice to get the harmonic wave of the rectified input voltage signal, another multiplier multiplying the harmonic wave of the rectified input voltage signal and the rectified input voltage signal to get another harmonic wave of a $3^{rd}$ harmonic of the rectified input voltage signal sent to the subtracter.

4. The power factor correction circuit of claim 3, wherein the harmonic regulation unit includes more than two multipliers generating the voltage signal containing harmonic of $5^{th}$ harmonic or $7^{th}$ harmonic or the combination of the harmonic thereof.

5. The power factor correction circuit of claim 1, wherein the waveform regulation unit is a multiplier to multiply the feedback signal and the voltage signal containing $3^{rd}$ harmonic to generate the current reference signal.

6. The power factor correction circuit of claim 1, wherein the control unit makes the inductor current follow the herein current reference by any means of closed loop control method.

7. The power factor correction circuit of claim 1, wherein the output voltage ripple of the power factor correction circuit is very large, saying hundreds of voltage peak-to-peak, therefore, the storage capacitance can be significantly reduced, and a storage capacitor with less capacitance can be used.

* * * * *